United States Patent [19]
Hannah

[11] Patent Number: 5,758,091
[45] Date of Patent: May 26, 1998

[54] METHOD AND APPARATUS FOR ADJUSTING VIDEO DATA TO LIMIT THE EFFECTS OF AUTOMATIC GAIN CONTROL ON MOTION ESTIMATION VIDEO CODERS

[75] Inventor: Eric C. Hannah, Pebble Beach, Calif.

[73] Assignee: Intel Corporation, Santa Clara, Calif.

[21] Appl. No.: 513,440

[22] Filed: Aug. 10, 1995

[51] Int. Cl.$^6$ ........................................... H04N 9/79
[52] U.S. Cl. ........................ 395/200.77; 382/232
[58] Field of Search ................ 364/514 R, 715.02; 348/700, 699, 394, 407, 415, 416; 386/109, 112; 382/232, 236, 238, 274; 395/114, 132, 200.77

[56] References Cited

U.S. PATENT DOCUMENTS

| | | |
|---|---|---|
| 4,837,632 | 6/1989 | Kubo et al. . |
| 4,989,087 | 1/1991 | Pele et al. ........................... 348/416 |
| 5,107,293 | 4/1992 | Sekine et al. . |
| 5,198,896 | 3/1993 | Kondo et al. . |
| 5,384,595 | 1/1995 | Sakaguchi . |
| 5,463,565 | 10/1995 | Cookson et al. ................... 364/514 R |
| 5,500,689 | 3/1996 | Lam .................................... 348/699 |
| 5,561,477 | 10/1996 | Polit ................................... 348/700 |

*Primary Examiner*—Ellis B. Ramirez
*Assistant Examiner*—Thomas Peeso
*Attorney, Agent, or Firm*—William H. Murray; N. Stephan Kinsella

[57] ABSTRACT

A method and apparatus for removing from frames of video the effects of automatic gain control (AGC), preferably to prevent the AGC effects from adversely affecting a video codec architecture using motion estimation. Video images are processed by first characterizing the luminance of first and second frames of video data. Any difference in the characterized luminance values is determined. The luminance of the second frame is adjusted based on the determined difference between the luminance of the first frame and the luminance of the second frame, to generate an adjusted second frame. The adjusted second frame is encoded to generate encoded video signals for the second frame.

24 Claims, 5 Drawing Sheets

METHOD AND APPARATUS FOR ADJUSTING VIDEO DATA TO LIMIT THE EFFECTS OF AUTOMATIC GAIN CONTROL ON MOTION ESTIMATION VIDEO CODERS

BACKGROUND OF THE INVENTION

1. Field of the Invention

This invention relates to the field of video processing and more particularly to motion estimation used in video compression.

2. Description of the Related Art

Motion estimation is commonly used by video encoders that compress successive frames of digital video data ("video frames"). When video frames are to be transmitted via a communication medium of limited bandwidth, or are to be stored in a storage medium having limited storage capacity, it often is desirable to compress the digital data which represents each frame, so as to reduce the amount of data that needs to be transmitted or stored.

Motion estimation and motion compensation exploit the temporal correlation that often exists between consecutive video frames. For block-based motion estimation, each input frame is divided into blocks and motion estimation is performed on each block relative to blocks in a reference frame (block matching) to generate a motion vector for each block. These motion vectors are then used to assemble a motion compensated frame. Any difference between the motion compensated frame and the input frame is represented by difference data. Since motion vectors and difference data are typically represented with fewer bits than the pixels that comprise the original image, fewer bits need to be transmitted (or stored) in order to represent the input frame. In some conventional video encoders, the motion vectors (and difference data) are further encoded to generate an encoded bitstream for the video sequence. It is preferred that block matching be accurate, as this will tend to minimize the magnitude of the motion vectors and, especially, the amount of difference data.

A reference frame can be the previous motion compensated frame or a "key" frame, which is an actual frame of video not compressed by motion estimation processing. Many conventional video encoders are designed to transmit a key frame at predetermined interval e.g. every 10th frame, or at a scene change.

Often, motion vectors are very similar from block to block. In an ideal video encoding system, during slow camera panning of a static scene, all of the motion vectors (except perhaps those for blocks at the edge of an image) point in the direction of the camera's motion and are of equal magnitude. This allows a video coder to use standard techniques such as run length encoding to further encode the motion vectors.

Real video capture systems alter a video image in ways which may be insignificant and unnoticeable to human vision, but which may be detected and treated as real motion by the video coder during motion estimation processing. For example, noise such as that induced by automatic gain control (AGC) can have an adverse affect on the codec bit rate by increasing the number and magnitude and reducing the run lengths of run-length-encoded motion vectors, and by increasing the magnitudes of the frame difference signals.

AGC circuits adjust image intensity by shifting average frame luminance values to provide, on a per frame basis, the best overall contrast and/or brightness ratios. Typically, an AGC circuit disposed, for example, in a camera, includes a sensor or the like operable to assess the overall brightness or contrast ratio of a scene. The AGC will brighten or darken frames of video as necessary to maintain a desired overall brightness or contrast ratio. Typically, AGC effects appear as relatively smooth, constant changes from frame-to-frame over a relatively long sequence of frames. Although use of AGC is intended to provide video better suited for viewing than video not subject to AGC compensation, AGC use can effect motion estimation processing by causing block mismatching and a consequent increase in the number and magnitude of motion vectors, a decrease in run lengths and an increase in the magnitude of frame difference values during motion estimation processing, leading to increased data rates.

A process and apparatus therefore are needed for characterizing the effects of AGC action on frames of video, primarily when the video is to be encoded using motion estimation, and for adjusting the video to offset the AGC effects to prevent them from adversely affecting motion estimation processing.

SUMMARY OF THE INVENTION

It is an object of the invention to provide an apparatus and computer-implemented method and computer program for reducing the adverse affects of AGC on motion estimation processing.

These and other objects are satisfied by the apparatus and method of the invention, which adjusts data associated with a motion estimation video codec architecture. Such an architecture generates motion vectors, motion compensated frames and difference frames from reference and input frames. In the invention one or more input frames are adjusted to remove the effects on the luminance of the frame caused by AGC.

In a preferred embodiment, the invention processes video images by first characterizing the luminance of a first frame and characterizing the luminance of a second frame. The invention then determines a difference in luminance between the first and second frames. If a difference is determined, the invention adjusts the luminance of the second frame based on the determined difference between the luminance of the first frame and the luminance of the second frame, to generate an adjusted second frame. The adjusted second frame is encoded to generate encoded video signals for the second frame.

BRIEF DESCRIPTION OF THE DRAWINGS

The following detailed description will be more fully understood with reference to the accompanying drawings in which.

DETAILED DESCRIPTION OF THE PREFERRED EMBODIMENTS

Figure 1:
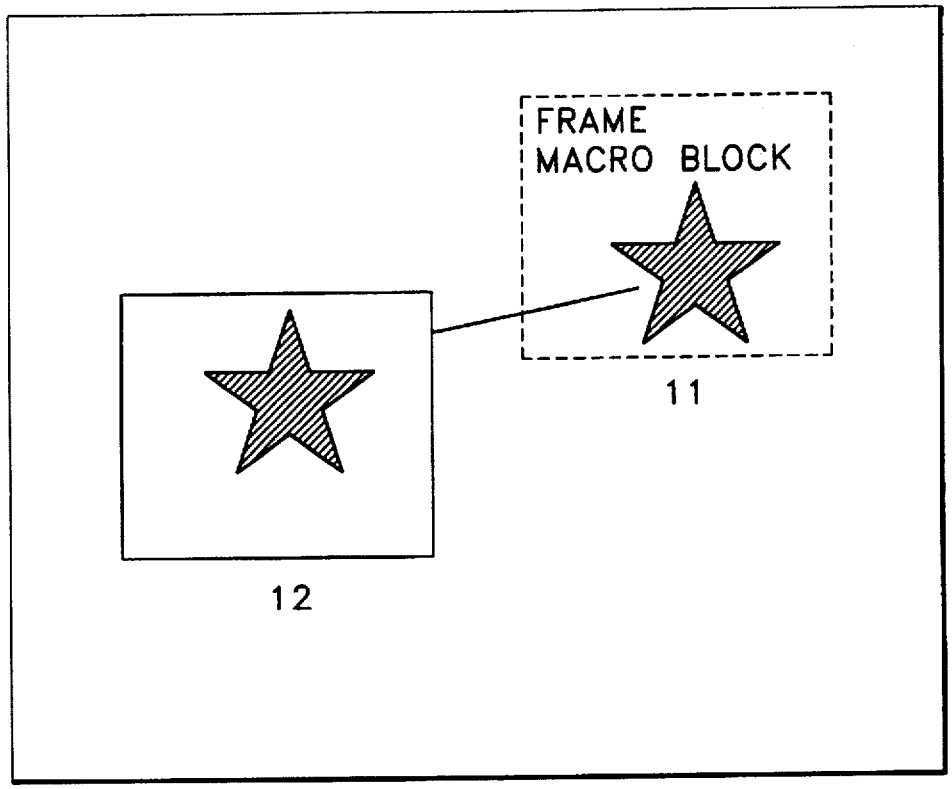
FIG. 1 is an illustration of block matching between frames.

As noted, motion estimation and motion compensation exploit the temporal correlation that often exists between consecutive video frames. As shown in FIG. 1, block 11 represents a block in a reference frame and block 12 a block in an input frame. The block in the input frame is shown in FIG. 1 to be displaced in two dimensions with respect to the same block in the reference frame as a result of object and/or camera movement. However, most of the information in the block, i.e. the pixel values, is relatively unchanged.

Figure 2:
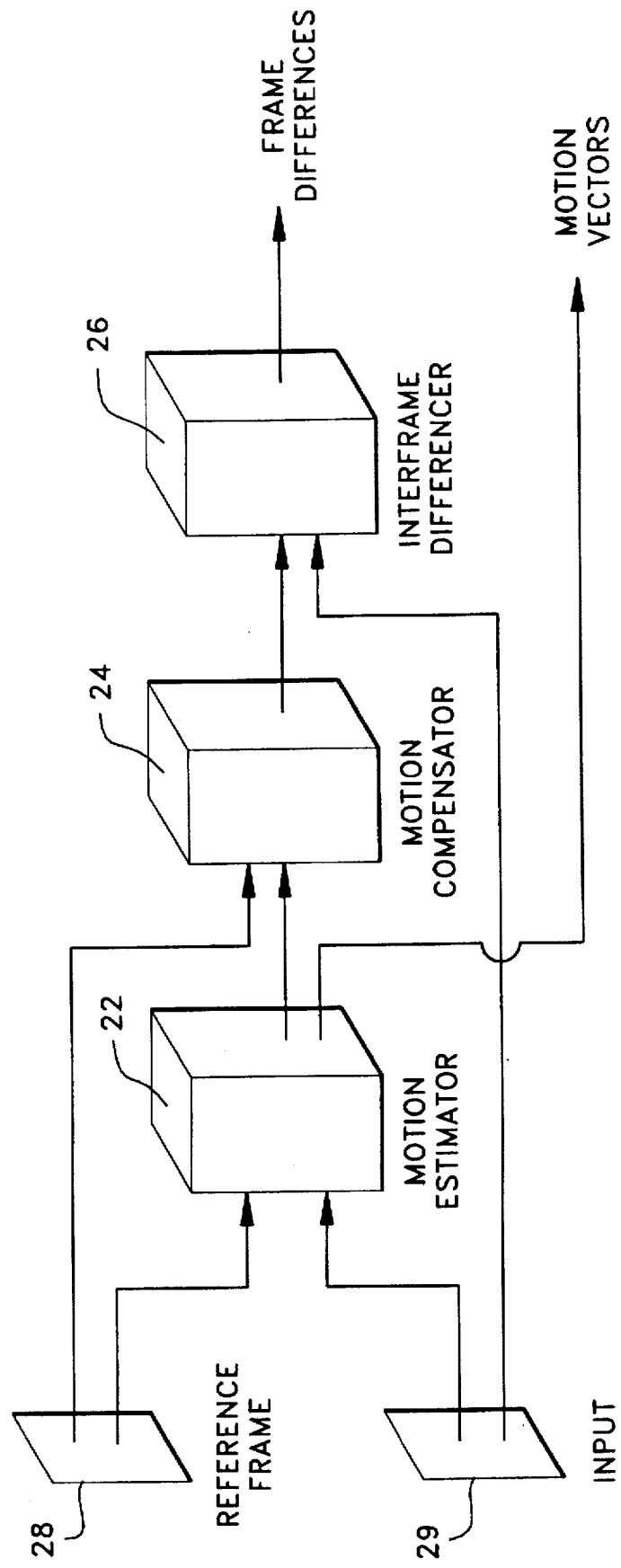
FIG. 2 is a block diagram of a prior art motion estimation video codec architecture.

Referring now FIG. 2, there is shown typical motion estimation video codec architecture 20. Motion estimator 22 compares blocks in an input frame 29 to regions or blocks within reference frame 28, searching for a best match between blocks. This is known as block matching. Motion estimator 22 generates motion vectors corresponding to the displacement of blocks in input frame 29 from respective best-matching blocks in reference frame 28.

Motion compensator 24 applies the motion vectors generated by motion estimator 22 to corresponding blocks in reference frame 28 to generate a motion compensated frame. Motion compensator 24 essentially moves reference frame blocks into the positions which correspond to the positions in which the best matching blocks have been located in input frame 29. Interframe differencer 26 generates frame differences by subtracting the motion compensated frame from the input frame. The motion vectors and the frame differences for the various blocks may then be further encoded for transmission and/or storage.

AGC typically causes widespread shifting of, for example, average frame luminance values from frame to frame, thereby adversely affecting the block matching process. AGC will cause macro-block misplacement as the motion estimation block matching process will miss what, without the effects of AGC, would have been the appropriate match, and instead settle for a bad match. The effects of AGC on motion estimation are particularly egregious where there has been no motion. In such a case, but for the AGC effects, there would be no motion vectors generated and no frame differences, and therefore no or very little data to encode and transmit or store. The AGC effects, however, which globally alter pixel luminance values for a frame, will make it seem to motion estimator 22 that motion has occurred. For example, if an input frame is lightened by 10% as compared to a previous frame, a block in the input frame will be matched with a comparably light block in the reference frame, not the block which otherwise would be the best match, i.e. which includes a similar or identical image, because that potentially best matching block in the reference frame is 10% darker. According to the present invention, prior to performing motion estimation, the AGC effects are characterized and removed or reduced.

Figure 3:
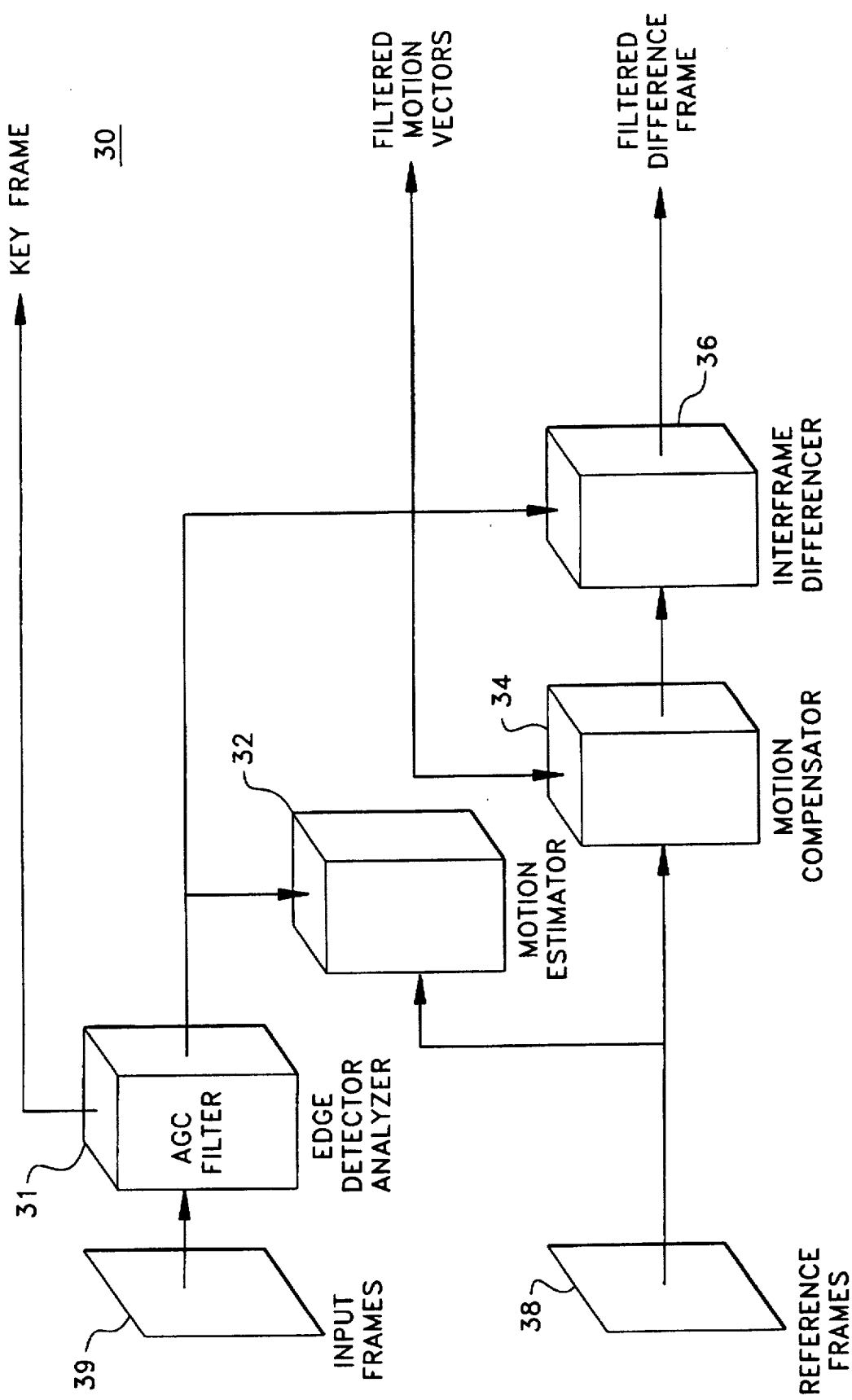
FIG. 3 is a block diagram of a preferred embodiment of the AGC adjusting motion estimation video codec architecture of the present invention.

Referring now to FIG. 3, there is shown a block diagram of the video codec architecture of the present invention. Video codec architecture 30 includes automatic gain control (AGC) filter 31, motion estimator 32, motion compensator 34, and interframe differencer 36.

AGC filter 31 senses the average video frame luminance or intensity values of video frames input at 39. Input video frames may be key frames (frames which will not be subjected to motion estimation compression), frames which will be subjected to motion estimation processing or, usually, some combination of both. AGC filter 31 preferably stores the average luminance or intensity value of the key frames and compares the average luminance or intensity values of the subsequent frames input at 39 to that of the key frame. For this reason, key frames input at 39 are transmitted to AGC filter 31, where their luminance or intensity values are identified and stored, prior to being transmitted uncompressed by video codec architecture 30. In the event AGC filter 31 determines that the average luminance or intensity value of a subsequent input frame 39 differs from that of a key frame, AGC filter 31 adjusts the average luminance or intensity value of that input frame to a value equal to or approximating that of the key frame, before transmitting the frame data to motion estimator 32 and interframe differencer 36.

Figure 4:
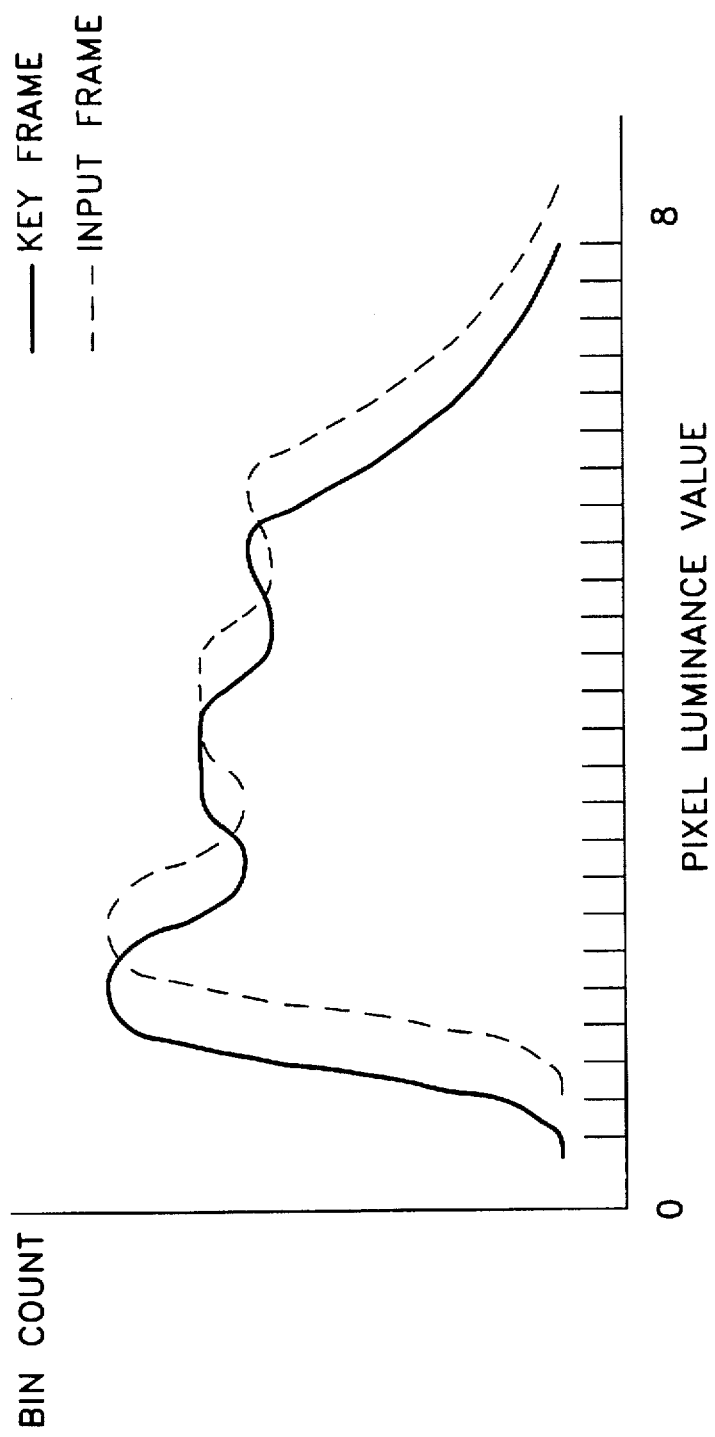
FIG. 4 is a graph of the log of frame luminance values of an input and reference frame showing the typical effects of AGC.

In a preferred embodiment, AGC filter 31 compares plots of frame luminance values for compared frames. FIG. 4 shows a comparison of the input frame and the reference frame showing the effects of AGC. There is a high degree of cross-correlation between the plots, with a slight displacement along the x-axis. This displacement is equivalent to the gain factor applied by the AGC. When AGC is identified, AGC filter 31 adjusts the average luminance values of the input frame to diminish the effects of AGC.

In a preferred embodiment, AGC filter 31 adjusts every input frame transmitted after a key frame to compensate for AGC effects, which will appear as an average frame luminance or intensity value different than that of the key frame. Preferably AGC filter 31 adjusts every frame in which the effect of AGC is recognized such that the average luminance or intensity of the frame is made equal or approximate to that of the key frame. For example, where a frame's luminance is brightened 10% as compared to a key frame, AGC filter 31 preferably darkens the frame's luminance 10%, or at least approximately 10%. The AGC filtering of the invention therefore enables motion estimator 32 to generate motion vectors from real displacement matches, not mismatches induced by the effects of AGC. Similarly, the motion compensated frame generated by motion compensator 34 is differenced by interframe differencer 36 with the filtered input frame from AGC filter 31 to reduce the amount of difference data generated.

Figure 5:
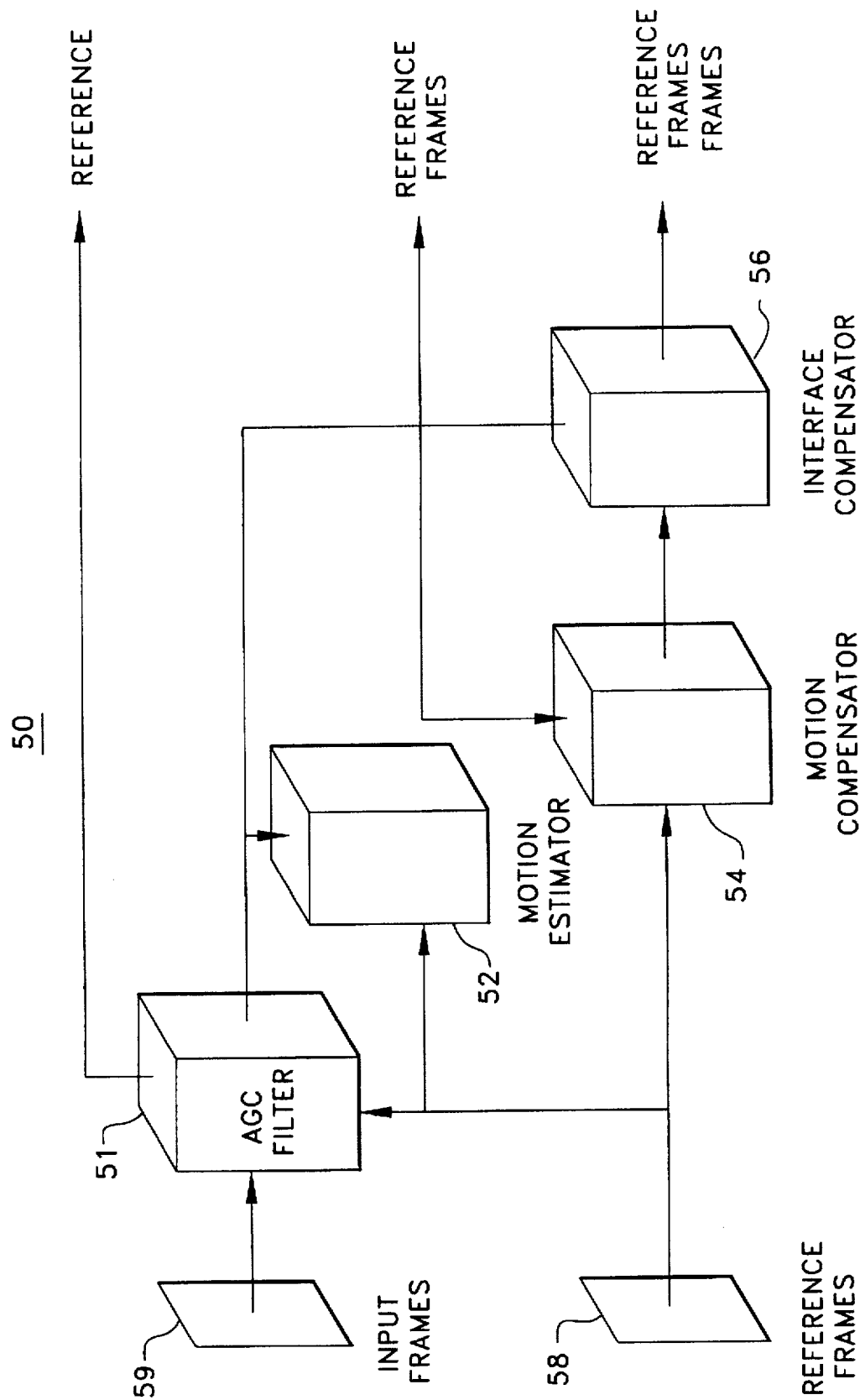
FIG. 5 is a block diagram of another embodiment of the AGC adjusting motion estimation video codec architecture of the present invention.

As shown in FIG. 5, AGC filter 51, in another embodiment of the invention, can compare the average luminance or intensity of an input frame 59 to that of reference frame 58, instead of to a stored value representing the last received key frame. Reference frame 58 can be, for example, an immediately preceding video frame which has been compressed and decompressed (companded) by the motion estimation encoder and which has been itself filtered to remove AGC effects. Reference frame 58 also can be an key frame, if the key frame immediately preceded the subject input frame. Since the luminance and intensity of input frames are being compared to that of reference frames, AGC filter 51 is not required to store the luminance and/or intensity values of the key frames. Key frames simply can be passed on, uncompressed, through AGC filter 51 of video codec architecture 50. As is well known to persons of ordinary skill, a key frame input at 59 will appear, essentially concurrently upon input of a subsequent frame, as the reference frame at 58. In the embodiment depicted in FIG. 5, AGC filter 51 generally is required to adjust the luminance or intensity of most input frames by a smaller amount, as compared to the embodiment of FIG. 3, since each input frame which is not a key frame is compared to and adjusted relative to, if necessary, an immediately preceding frame which itself has been adjusted to account for any AGC effects.

In cases where there has been a substantial scene change, AGC-like effects will appear. However, in such cases there will be little cross-correlation among blocks, and in the luminance plots, which can be understood to mean that there has been a scene change which should be encoded with a new key frame. Small shifts in the plots in average frame luminance or intensity values likely result from AGC action, which is subject to remedial action by AGC filter 31 or 51.

After filtering to remove AGC effects from a frame's luminance or intensity value, conventional motion estimation may be performed. As noted above, motion estimation involves a search in a reference frame for a block substantially corresponding to a block in a current or input frame. When motion has occurred, the blocks will be displaced in at least one of the x and y planes. This displacement is quantified as a motion vector representing the x and/or y displacement. AGC filters 31 and 51, by adjusting the input frame's average frame luminance or intensity value as necessary to provide agreement or near agreement with the luminance or intensity values of a preceding key or reference frame, reduces instances of block mismatching which otherwise would occur. By reducing block mis-matching, the invention reduces the number and magnitude of motion vectors and the amount of frame difference data. The invention also can preserve long run lengths of run length encoded motion vectors. Typically, as shown in FIG. 2, motion vectors are encoded and transmitted with, for example, frame difference data when performing motion-compensated video encoding. The invention therefore reduces the amount of data which must be encoded and transmitted or stored.

It is preferable that the AGC effects in the video sequence not be completely removed from the video sequence as a whole. Therefore, in a preferred embodiment of the invention, the AGC effects are included as necessary during transmission of key frames, instead of on a frame-to-frame basis as is known. For example, where an AGC circuit is darkening frames 2–10 by 2% relative to each preceding frame, by frame 10, the scene will have darkened a total of 18% relative to the first frame. In the embodiment of FIG. 3 for example, AGC filter 31 preferably adjusts the average luminance or intensity value of each frame back to that of, for example, frame 1 (frame 2 will be lightened approximately 2%, frame 3 approximately 4%, etc) thereby suppressing the AGC action on these frames. However at the next key frame, such as for example frame 10, the invention preferably transmits the frame as is, including the accumulated effects of AGC. In the preferred embodiment, therefore, key frame 10 will be approximately 18% darker than frame 1, but frames 2–9 preferably will have an average luminance or intensity identical or similar to that of frame 1. The preferred embodiment preferably uses the average luminance or intensity value of key frame 10 as a reference point for subsequent input frames until transmission of the next key frame.

In another embodiment of the invention, the contrast ratios of key and subsequent input frames, either instead of or in combination with the average luminance or intensity values, are monitored and adjusted by AGC filter 31 and 51 in the same manner as disclosed above with respect to FIGS. 3 and 5.

The invention advantageously adjusts video data in association with motion estimation processing to reduce the amount of data which must be compressed and transmitted or stored, and to increase image quality. In a preferred embodiment of the invention, AGC effects on a frame's luminance or intensity are characterized and adjusted, such that the frame's luminance or intensity is made to agree with or approximate a reference value established by a key frame. This process helps cause blocks to be properly matched during the block-matching process and during generation of motion vectors associated with motion estimation video coders. The invention helps reduce the amount and magnitude of motion vectors and preserves long runs of run-length encoded motion vectors. Furthermore, the invention reduces difference frame data.

The present invention can be embodied in the form of computer-implemented processes and apparatuses for practicing those processes, as well as in the form of computer programs embodied in tangible media, such as floppy diskettes, CD-ROMs, hard drives, or any other computer-readable medium, wherein, when the computer program is loaded into and executed by a computer, the computer becomes an apparatus for practicing the invention.

The preferred embodiment of the invention shown and described employs filtering of the effects of AGC from video data. It should be understood that various changes in the details, materials, and arrangements of the parts which have been described and illustrated in order to explain the nature of this invention may be made by those skilled in the art without departing from the principle and scope of the invention as expressed in the following claims.

What I claim is:

1. A computer implemented process for processing video images comprising the steps of:
   (a) characterizing at least one of the luminance, intensity or contrast ratio of a first frame;
   (b) characterizing at least one of the luminance, intensity or contrast ratio of a second frame;
   (c) determining a difference in at least one of the luminance, intensity or contrast ratio between the first and second frames;
   (d) adjusting at least one of the luminance, intensity or contrast ratio of the second frame based on the difference to generate an adjusted second frame;
   (e) encoding the adjusted second frame to generate encoded video signals for the second frame.

2. The process of claim 1, wherein the first frame is a key frame.

3. The process of claim 2, further comprising the steps of:
   (f) characterizing at least one of the luminance, intensity or contrast ratio of frames subsequent to the second frame;
   (g) determining a difference in at least one of the luminance, intensity or contrast ratio between each of the subsequent frames and the first frame;
   (h) adjusting at least one of the luminance, intensity or contrast ratio of the subsequent frames based on the difference to generate subsequent adjusted frames;
   (i) encoding the subsequent adjusted frames to generate encoded video signals for the subsequent frames.

4. The process of claim 2, wherein the characterized at least one of the luminance, intensity or contrast ratio of the key frame is stored as a data value.

5. The process of claim 1, wherein step (d) comprises adjusting at least one of the luminance, intensity or contrast ratio of the second frame such that it essentially equals at least one of the luminance, intensity or contrast ratio of the first frame.

6. The process of claim 1, wherein the luminance of the first and second frames are characterized as respective plots of data and the difference is determined by comparing the plots.

7. The process of claim 1, wherein the process is used in association with motion estimation video compression and the first frame is a motion estimation companded reference frame.

8. The process of claim 1, wherein the process is used in association with motion estimation video compression, and the encoded video signals for the second frame comprise motion vectors and frame differences.

9. An apparatus for processing video images, comprising:

(a) means for characterizing at least one of the luminance, intensity or contrast ratio of a first frame;

(b) means for characterizing at least one of the luminance, intensity or contrast ratio of a second frame;

(c) means for determining a difference in at least one of the luminance, intensity or contrast ratio between the first and second frames;

(d) means for adjusting at least one of the luminance, intensity or contrast ratio of the second frame based on the difference to generate an adjusted second frame;

(e) means for encoding the adjusted second frame to generate encoded video signals for the second frame.

10. The apparatus of claim 9, wherein the first frame is a key frame.

11. The apparatus of claim 10, further comprising:

(f) means for characterizing at least one of the luminance, intensity or contrast ratio of frames subsequent to the second frame;

(g) means for determining a difference in at least one of the luminance, intensity or contrast ratio between each of the subsequent frames and the first frame;

(h) means for adjusting at least one of the luminance, intensity or contrast ratio of the subsequent frames based on the difference to generate subsequent adjusted frames;

(i) means for encoding the subsequent adjusted frames to generate encoded video signals for the subsequent frames.

12. The apparatus of claim 10, further comprising means for storing a data value representing the characterized at least one of the luminance, intensity or contrast ratio of the key frame.

13. The apparatus of claim 9, wherein means (d) comprises means for adjusting at least one of the luminance, intensity or contrast ratio of the second frame such that it essentially equals at least one of the luminance, intensity or contrast ratio of the first frame.

14. The apparatus of claim 9, wherein means (a) and (b) comprise means for characterizing the luminance of the first and second frames as respective plots of data, and means (c) comprises means for comparing the plots to determine the difference.

15. The apparatus of claim 9, wherein the apparatus is used in association with motion estimation video compression and the first frame is a motion estimated companded reference frame.

16. The apparatus of claim 9, wherein the apparatus is used in association with motion estimation video compression and the encoded video signals for the second frame comprise motion vectors and frame differences.

17. A storage medium having stored thereon a plurality of instructions for processing video images, wherein the plurality of instructions, when executed by a processor, cause the processor to perform the steps of:

(a) characterizing at least one of the luminance, intensity or contrast ratio of a first frame;

(b) characterizing at least one of the luminance, intensity or contrast ratio of a second frame;

(c) determining a difference in at least one of the luminance, intensity or contrast ratio between the first and second frames;

(d) adjusting at least one of the luminance, intensity or contrast ratio of the second frame based on the difference to generate an adjusted second frame;

(e) encoding the adjusted second frame to generate encoded video signals for the second frame.

18. The storage medium of claim 17, wherein the first frame is a key frame.

19. The storage medium of claim 18, wherein the plurality of instructions cause the processor to perform the further steps of:

(f) characterizing at least one of the luminance, intensity or contrast ratio of frames subsequent to the second frame;

(g) determining a difference in at least one of the luminance, intensity or contrast ratio between each of the subsequent frames and the first frame;

(h) adjusting at least one of the luminance, intensity or contrast ratio of the subsequent frames based on the difference to generate subsequent adjusted frames;

(i) encoding the subsequent adjusted frames to generate encoded video signals for the subsequent frames.

20. The storage medium of claim 18, wherein the plurality of instructions cause the processor to perform the further step of storing a data value representing the characterized at least one of the luminance, intensity or contrast ratio of the key frame.

21. The storage medium of claim 17, wherein step (d) comprises the step of adjusting at least one of the luminance, intensity or contrast ratio of the second frame such that it essentially equals at least one of the luminance, intensity or contrast ratio of the first frame.

22. The storage medium of claim 17, wherein the luminance of the first and second frames are characterized as respective plots of data and the difference is determined by comparing the plots.

23. The storage medium of claim 17, wherein the medium is used in association with motion estimation video compression and the first frame is a motion estimation companded reference frame.

24. The storage medium of claim 17, wherein the medium is used in association with motion estimation video compression and the encoded video signals for the second frame comprise motion vectors and frame differences.

* * * * *